United States Patent [19]

Agazzi et al.

[11] Patent Number: 4,982,428

[45] Date of Patent: Jan. 1, 1991

[54] ARRANGEMENT FOR CANCELING INTERFERENCE IN TRANSMISSION SYSTEMS

[75] Inventors: Oscar E. Agazzi, Scotch Plains; Taiho Koh, Hillsborough, both of N.J.

[73] Assignee: AT&T Bell Laboratories, Murray Hill, N.J.

[21] Appl. No.: 291,817

[22] Filed: Dec. 29, 1988

[51] Int. Cl.$^5$ .............................................. H04M 1/00
[52] U.S. Cl. .................................. 379/411; 379/410; 370/32.1
[58] Field of Search ............... 379/410, 411; 370/32.1, 370/32; 375/103, 101, 14; 333/18, 28

[56] References Cited

U.S. PATENT DOCUMENTS

| | | |
|---|---|---|
| 3,646,480 | 2/1972 | Spaulding . |
| 3,798,560 | 3/1974 | Taylor . |
| 4,057,696 | 11/1977 | Gitlin et al. . |
| 4,539,675 | 9/1985 | Fisher ........................................ 370/32 |
| 4,571,719 | 2/1986 | Carlqvist et al. .................... 379/411 |
| 4,727,543 | 2/1988 | Bauer ................................. 370/32.1 |
| 4,755,984 | 7/1988 | Ambrosio et al. . |
| 4,769,808 | 9/1988 | Kanemasa et al. ................. 370/32.1 |
| 4,868,874 | 9/1989 | Takatori et al. ..................... 379/411 |

OTHER PUBLICATIONS

*Proceedings of the 1986 Communications Conference (GLOBECOM)*, "Mixed Recursive Echo Canceller (MREC)", by C. Mogavero, G. Nervo, and G. Paschetta, pp. 44–48.
*Proceedings of 1987 International Communications Conference*, "Architecture for Fully Integrated Echo Canceller LSI Based on Digital Signal Processing", by H. Takatori, M. Kokubo, T. Shinotsuka, T. Kameyama, T. Suzuki, and M. Kokumai, pp. 601–605.
*IEEE Transactions on Communications*, vol. COM-30, No. 9, Sep. 1982, "Large-Scale Integration of Hybrid-Method Digital Subscriber Loops", by O. Agazzi, D. A. Hodges and D. G. Messerschmitt, pp. 2095–2108.
*The Bell System Technical Journal*, vol. 58, No. 2, Feb. 1979, "Combining Echo Cancellation and Decision Feedback Equalization", by K. H. Mueller, pp. 491–500.
*IEEE Transactions on Acoustics, Speech and Signal Processing*, vol. ASSP-27, No. 6, Dec. 1979, "Digital Echo Cancellation for Baseband Data Transmission", by N. A. M. Verhoeckx, H. C. van den Elzen, F. A. M. Snijders, and P. J. van Gerwin, pp. 768–781.

*Primary Examiner*—Jin F. Ng
*Assistant Examiner*—Jhancy Augustus
*Attorney, Agent, or Firm*—L. H. Birnbaum

[57] ABSTRACT

In an arrangement for simultaneously exchanging digital symbols between terminals over a bidirectional transmission path, near term interference in the signal received from the transmission path is canceled by storing the sequence of successive digital symbols 1, 2, ..., N applied to the transmission path, forming a replica of the interference from the stored digital symbols and subtracting the replica from the received signal. A signal representative of a replica of the interference occurring subsequent to the Nth digital symbol of the successive digital symbols 1, 2, ..., N is then generated and combined with the signal having the interference corresponding to the stored symbol sequence removed to cancel the subsequent interference in the received signal. The signal representing the interference subsequent to the Nth digital symbol is generated by modifying the Nth stored symbol by an adaptive gain signal corresponding to the correlation of the subsequent interference replica signal with the signal having the interference removed, and recursively altering the modified Nth stored digital symbol with a prescribed impulse response representative of the characteristics of the bidirectional transmission path subsequent to the time periods of the sequence of successive digital symbols 1, 2, ..., N.

20 Claims, 7 Drawing Sheets

ARRANGEMENT FOR CANCELING INTERFERENCE IN TRANSMISSION SYSTEMS

FIELD OF THE INVENTION

The invention relates to digital communication and more particularly to interference removal in bidirectional digital transmission systems.

BACKGROUND OF THE INVENTION

Subscriber loop transceivers used in baseband data transmission systems such as the integrated services digital network (ISDN) share a single transmission medium over which terminals may simultaneously transmit and receive data signals. In order to maintain simultaneous transmission and reception, it is necessary to remove interference due to signals being transmitted appearing at the input of the receiver and intersymbol disturbances so that the received signal may be detected. Decision feedback equalizers have been used to compensate for intersymbol interference in the received signal as a result of the frequency dependent attenuation characteristics of the transmission line and echo cancelers are used to remove the transmitted signal reflected back to the receiver input.

Generally, both decision feedback equalizers and echo cancelers have been of the adaptive transversal filter type. As is well known in the art, such transversal filters span a finite time period and can only compensate for an impulse response of finite duration. The finite duration response, however, is only an approximation to the actual response of the transmission channel for both the path of an echo and the path of the received signal whereby compensation is only effective for near term interference. The far term interference or tails of the echo path or received signal path impulse responses are beyond the span of the transversal filter and cannot be canceled. Consequently, there is a degradation of system performance.

Recursive type filters such as disclosed in U.S. Pat. Nos. 3,646,480 issued Feb. 29, 1972 to D. A. Spaulding and 3,798,560 Mar. 19, 1974 issued to M. G. Taylor describe arrangements using recursive filter structures for equalization which may also be used for echo cancellation. Such recursive filters, however, are more difficult to adapt than nonrecursive filters using the transversal structure since the gradient adaptation method for transversal type filters is unstable when applied to recursive type filters. Adaptation methods such as disclosed in U.S. Pat. No. 4,057,696 issued to R. D. Gitlin et al Nov. 8, 1977 overcome the instability problem but are complex and are best suited for voiceband echo cancelers or modems where the low sampling rate allows multiplexing of hardware.

At the high data rates used in ISDN transceivers, hardware requirements necessitate a simpler adaptation method. The article "Mixed Recursive Echo Canceller (MREC)" by C. Mogavero et al appearing in the *Proceedings of the 1986 Global Communications Conference (GLOBECOM)* at pages 44-48 and U.S. Pat. No. 4,755,984 issued to R. Ambrosio et al Jul. 5, 1988 describe a tail canceler structure in which a nonrecursive filter exhibits a finite impulse response of the "boxcar integrator" type. This canceler structure adapts its gain using a modified version of the gradient method. Such adaptation has a sufficient length to approximate cancellation but the impulse response is finite whereby the degree of cancellation is limited.

The article "Architecture for Fully Integrated Echo Canceller LSI Based on Digital Signal Processing" by Hiroshi Takatori et al appearing in *Proceedings of 1987 International Communications Conference* at pp. 601 through 605 discloses an arrangement in which the aforementioned "boxcar integrator" is replaced by an ideal integrator having a step function impulse response which is used in combination with a vector quantization technique to adapt the filter gain. As is well known, the response of a transmission line for the tail component is primarily dependent on the parameters of the transformer used to couple the transceiver to the line and is largely independent of the line characteristics. The infinite impulse response selected to simplify the hardware needed for implementation by Takatori et al, however, is a relatively poor approximation to this transmission line response resulting in incomplete cancellation. It is an object of the invention to provide improved echo and intersymbol interference cancellation with higher accuracy removal of the tail portion components thereof.

SUMMARY OF THE INVENTION

The foregoing object is achieved by storing a sequence of symbols applied to the transmission medium, forming a replica of the interference from the stored symbols and canceling the portion of the echo corresponding to the stored symbol sequence. A replica of the tail portion of the interference is formed by recursively filtering the last stored symbol with a single pole exponentially decreasing impulse response characteristic and modifying the Nth stored symbol according to the result of the interference cancellation.

The invention is directed to a communication system for exchanging digital symbols between terminals over a bidirectional transmission path in which the tail portion of interference is canceled. The sequence of N successive digital symbols is stored and a replica of the near term interference corresponding to the stored symbol sequence is formed. A signal representative of a replica of the interference occurring subsequent to the sequence of N successive digital symbols is generated and combined with the signal having the interference corresponding to the stored sequence removed to cancel the subsequent interference in the received signal. The interference replica signal $p(n)$ is generated by modifying the Nth stored successive symbol by an adaptive gain signal corresponding to the correlation of the interference replica signal $p(n)$ with the signal having the interference removed, and recursively altering the modified Nth stored digital symbol with a prescribed impulse response representative of the characteristics of the bidirectional transmission path to form the interference replica signal $p(n)$.

According to one aspect of the invention, the near end echo due to the symbol sequence being transmitted from a terminal is canceled by storing the sequence of N successive digital symbols emitted from the terminal, forming a replica of the echo over the N symbol sequence and combining the echo replica with the received signal to remove the echo portion corresponding thereto. A signal $p_e(n)$ representative of a replica of the echo occurring subsequent to the sequence of N successive digital symbols from the terminal is formed and combined with the signal received from the far end having the echo corresponding to the stored sequence of N successive digital symbols removed to cancel the subsequent echo in the received signal. The echo replica signal $p_e(n)$ is generated by modifying the Nth stored successive symbol by a gain factor signal $g(n)$ corresponding to the correlation of the echo replica signal $p_e(n)$ with the signal having the near end echo removed, and recursively altering the modified Nth digital symbol with a prescribed impulse response corresponding to the characteristics of the bidirectional transmission path to form the echo replica signal $p_e(n)$.

According to another aspect of the invention, the far end intersymbol interference component in the received signal is canceled by storing the sequence of M successive digital symbols obtained from the received signal, forming a replica of the intersymbol interference due to the stored M successive digital symbols and combining the intersymbol interference replica with the received signal having near end echo removed to cancel the far end intersymbol interference therein. A signal $p_i(n)$ representative of the far end intersymbol interference subsequent to the stored sequence of M successive digital symbols is formed and combined with the signal having the intersymbol interference corresponding to the sequence of M successive digital symbols removed to cancel the subsequent intersymbol interference. The intersymbol interference replica signal $p_i(n)$ is generated by modifying the Mth stored successive symbol by a gain factor signal $g_i(n)$ corresponding to the correlation of the intersymbol interference replica signal $p_i(n)$ with the signal having the far end intersymbol interference removed, and recursively altering the modified Nth digital symbol with a prescribed impulse response corresponding to the characteristics of the bidirectional transmission path to form the echo replica signal $p_i(n)$.

DETAILED DESCRIPTION

Figure 1:
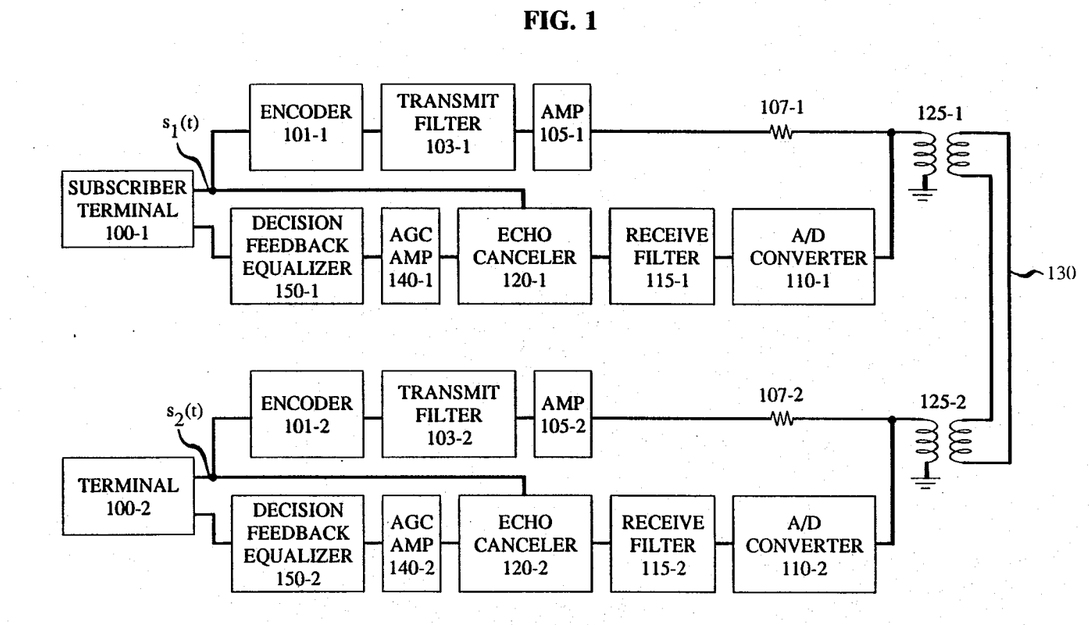
FIG. 1 depicts a general block diagram of a baseband transmission arrangement for simultaneous bidirectional transmission in which the invention is incorporated.

FIG. 1 illustrates a baseband arrangement for simultaneous bidirectional transmission of digital signals over a single two wire transmission line. In FIG. 1, a digital symbol sequence signal $s_1(t)$ is sent from subscriber terminal 100-1 to terminal 100-2 via a two wire transmission line 130. Terminal 100-2 may, for example, be at the central office end of a subscriber loop or may be another subscriber terminal. Another digital symbol sequence signal $s_2(t)$ may be sent simultaneously from terminal 100-2 over the same transmission line. Signals $s_1(t)$ and $s_2(t)$ can represent data, speech, image or other information that is in digital form. Signal $s_1(t)$ is applied to encoder 101-1 which produces a mulitlevel code representing one or more symbols of the input digital signal. For example, the two digital streams illustrated in waveforms 501 and 502 of FIG. 5 may be encoded into the four level 2B1Q coded signal shown in waveform 505. In waveform 505, the signal has four levels $-3, -1, +1$ and $+3$. The level of the 2B1Q signal is determined by the present states of waveforms 501 and 502. Waveform 501 corresponds to the sign bit of the 2B1Q code and waveform 502 corresponds to the magnitude bit of the code. If the sign bit is high while the magnitude bit is low as between $t_0$ and $t_1$, the 2B1Q symbol is $+3$ as shown in waveform 505. Where the sign bit is low and the magnitude bit is high as between $t_1$ and $t_2$, the 2B1Q symbol is $-1$. A high sign bit and a high magnitude bit as between times $t_3$ and $t_4$ results in a $+1$ symbol and a low sign bit with a low magnitude bit yields a $-3$ symbol as between times $t_7$ and $t_8$. The four level output signal from encoder 101-1 shown in waveform 505 is applied to transmit filter 103-1 wherein its high frequency components that would cause unnecessary disturbances to other services are removed. The filtered four level signal is applied via amplifier 105-1, matching impedance 107-1 and transformer 125-1 to the transmission line. The transmitted signal is illustrated in waveform 510 and the received signal corresponding thereto after being attenuated and dispersed by the transmission path is illustrated in waveform 515. The transmit filter is of the type described in the article "Large Scale Integration of Hybrid-Method Digital Subscriber Loops" by Oscar Agazzi, David A. Hodges and David G. Messerschmitt appearing in the *IEEE Transactions on Communications*, Vol. COM-30, No. 9, Sept. 1982, pp. 2095–2108. Signal $s_2(t)$ is similarly applied to line 130 from terminal 100-2.

The signal received from line 130 by transformer 125-1 comprises a component corresponding to the 2B1Q coded signal from terminal 100-2 as well as near end echo of the signal from amplifier 105-1 and intersymbol interference from the far end. In order to detect the signal received from station 100-2, the echo components corresponding to signal $s_1(t)$ must be substantially removed from the received signal before it is applied to terminal 100-1. The received signal on transformer 125-1 is sampled at a prescribed rate, e.g., 160 kHz and converted into successive digital values by analog to digital converter 110-1. The output of the A/D converter is modified in receive filter 115-1 and applied to one input of echo canceler 120-1. The receive filter is of the type described in the aforementioned article "Large Scale Integration of Hybrid-Method Digital Subscriber Loops" by Oscar Agazzi, David A. Hodges and David G. Messerschmitt and is adapted to remove unwanted spectral portions from the received signal. In canceler 120-1, a replica of the echo is formed from the successive symbols generated in station 100-1. As is well known in the art, the echo canceler uses the symbol sequence being transmitted to generate an echo replica. This echo replica is subtracted from the signal received from line 130 to remove the near end echo component therein.

Figure 6:
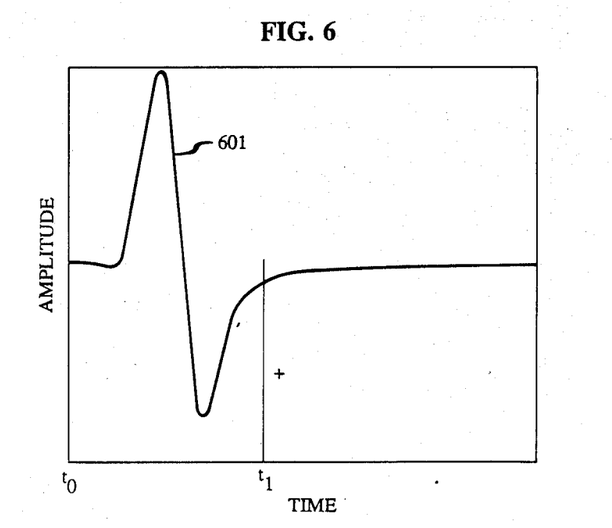
FIG. 6 shows waveforms illustrating echo characteristics in the baseband transmission arrangement of FIG. 1.

An example of the echo path impulse response of the line in FIG. 1 is shown in waveform 601 of FIG. 6. The echo signal is the result of the convolution of this impulse response with the sequence of symbols transmitted from the near end. In the predetermined time interval between $t_0$ and $t_1$, a transversal filter receiving a prescribed sequence of symbols from terminal 100-1 may be used to generate a replica of the echo signal for cancellation of echo component resulting from the impulse response of waveform 601. This near term or main portion of the echo pulse is modeled with a non-recursive FIR filter having a response $$d_j = \sum_{i=0}^{N-1} [c_j(k,i) \times (k-i)] \quad (1)$$

where
$x(k) \epsilon -3, -1, +1, +3$ is the 2B1Q symbol transmitted.

Figure 5:
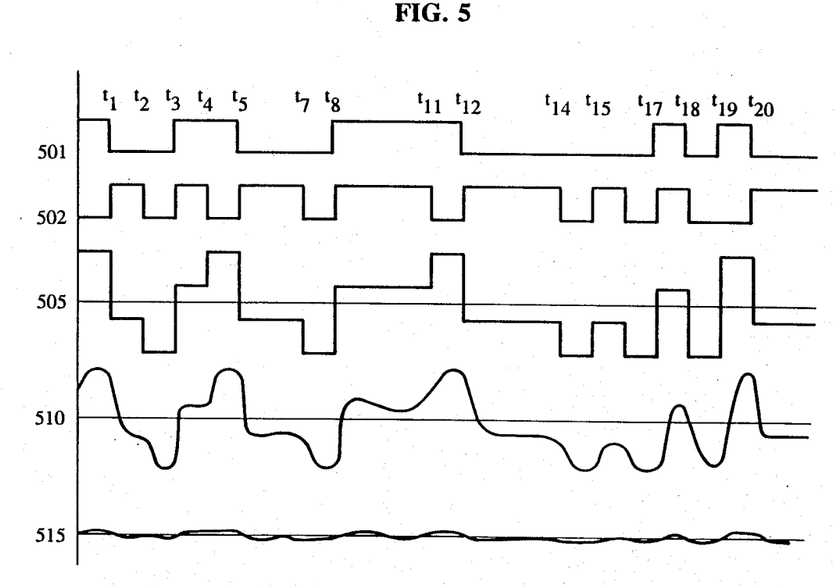
FIG. 5 shows waveforms illustrating the formation of the digital symbols in the circuit of FIG. 1.

The echo component, however, has a tail portion that extends beyond time $t_1$ for an indefinite period. While the tail portion is of a relatively small magnitude, the received signal as shown in waveform 515 of FIG. 5 is small so that effect of the tail interference on detection of the signal transmitted from terminal 100-2 is significant. Consequently, inaccurate cancellation of the echo tail has a deleterious effect on detection of the signal from station 100-2. Cancellation of the tail by means of a transversal filter is generally impractical since it requires storing the symbol sequence of an indefinite time interval. To provide accurate cancellation over the entire echo range, echo canceler 120-1 includes a transversal filter to remove the near end echo component between times $t_0$ and $t_1$ shown in FIG. 6 and a recursive tail canceler particularly adapted to remove the portion of the near end echo component occurring subsequent to time $t_1$ (FIG. 6).

The output of echo canceler 120 comprising the component corresponding to the symbol sequence from terminal 100-2 and the far end intersymbol interference is amplified in automatic gain controlled amplifier 140-1 and applied to decision feedback equalizer 150-1. The decision feedback equalizer is adapted to remove the far end intersymbol interference and to convert the resulting received signal into the symbol sequence received from terminal 100-2. Decision feedback equalizer 150-1 includes a non-recursive section which is of the type described in the article "Combining Echo Cancellation and Decision Feedback Equalization" by K. H. Mueller appearing in *The Bell System Technical Journal*, Vol. 58, No. 2, Feb. 1979, pp. 491-500 and a recursive equalizer section adapted to remove the tail portion of the far end intersymbol interference from the output of gain controlled amplifier 140-1.

Figure 2:
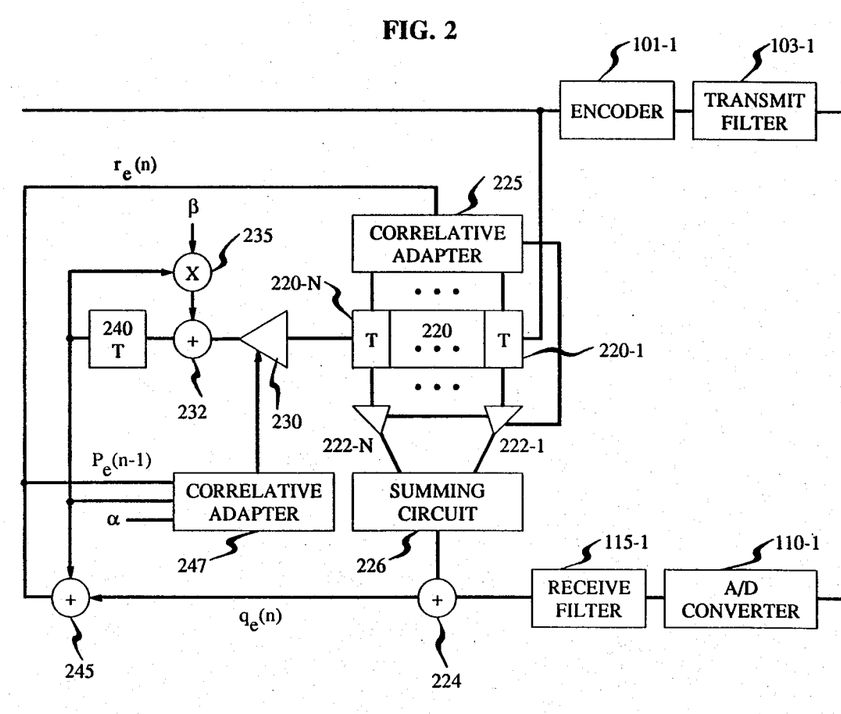
FIG. 2 depicts a more detailed block diagram of the echo canceler of FIG. 1 showing a tail canceler illustrative of the invention.

Echo Canceler 120-1 is shown in greater detail in FIG. 2. Referring to FIG. 2, the digital symbol sequence from station 100-1 is supplied to cell 220-1 of delay device 220 at the symbol transmission rate, e.g., 80 kilobaud. Each cell has a delay of one symbol period and the successive symbols are shifted down delay device 220 so that the delay device stores the sequence of the last N symbols in each symbol period n. The most recently produced symbol is stored in cell 220-1 and the Nth previously transmitted symbol is stored in cell 220-N. The 2B1Q code is a four level code whereby each digital symbol in delay device 220 has 2 bits which may be readily stored in compact form. As is well known in the art, the output of each cell of shift register 220 is supplied to one of the programmable gain amplifiers 222-1 through 222-N and to an input of correlative adapter 225. The outputs of the programmable gain amplifiers are combined in sum circuit 226 to form a replica of the near end echo component of the received signal from A/D converter 110-1. This echo replica cancels the near end echo component in the received signal corresponding to the sequence of N symbols stored in shift register 220. The cancellation is performed in summing circuit 224.

The output of summing circuit 245 which corresponds to the error in echo cancellation is fed back to correlative adapter 225 of the transversal filter wherein it is correlated with the sequence of N symbols stored in shift register 220 to adapt the set of N filter coefficients applied to the gain control circuits. The transversal filter is of the type described in the article "Digital Echo Cancellation for Baseband Data Transmission" by Niek A. M. Verhoeckx et al appearing in the *IEEE Transactions on Acoustics, Speech and Signal Processing*, Vol. ASSP-27, No. 6, Dec. 1979, pp. 768-781. Filter coefficient adaptation signals obtained from the correlative adapter are used to adjust programmable gain amplifiers 222-1 through 222-N so that maximum echo cancellation occurs in summing circuit 224.

Since shift register 220 stores a finite sequence of symbols, the aforementioned transversal filter arrangement is effective to cancel only the portion of the near end echo component applied to A/D converter 110-1 in FIG. 1 that corresponds to the stored symbol sequence. As a result, the echo cancellation is incomplete and the tail portion of the echo in the received signal remains. The signal $q_e(n)$ from summing circuit 224 comprises the current value of the desired received signal from station 100-2 and the current value of the tail portion of the echo occurring subsequent to time $t_1$ in FIG. 6. The tail segment of the near end echo is removed in the tail canceler portion of the echo canceler of FIG. 2 including gain control logic 230, the single pole recursive filter comprising adder 232, sample delay 240 and multiplier 235, summing circuit 245 and correlative adaptor 247. In accordance with the invention, the tail canceler recursively alters the Nth stored symbol with an impulse response characteristic of transformer 125 to form a replica $p_e(n-1)$ of the tail portion of the near end echo.

Figure 3:
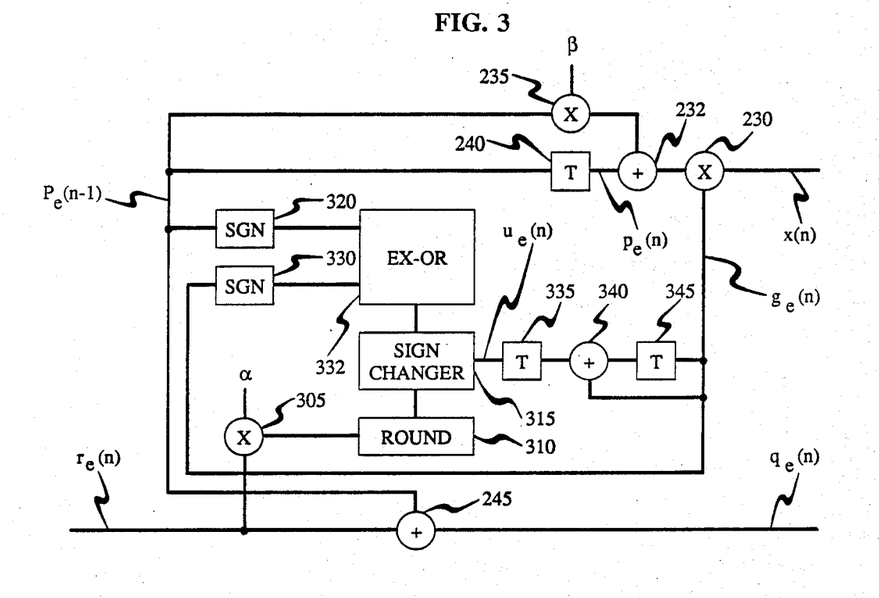
FIG. 3 depicts a detailed block diagram of the tail canceler of FIG. 2.

The tail canceler shown in greater detail in FIG. 3 operates to generate a signal $p_e(n-1)$ representing the present value of a replica of the near end echo tail. Echo replica signal $p_e(n-1)$ is combined with the signal $q_e(n)$ from summing circuit 224 of FIG. 2 to remove the tail portion of the near end echo from signal $q_e(n)$. The resulting signal $$r_e(n) = q_e(n) - p_e(n-1) \quad (2)$$

is then sent to amplifier 140-1 shown in FIG. 1 and to correlative adapters 225 and 247 shown in FIG. 2 as a cancellation error signal. In order to form echo replica signal $p_e(n-1)$, the output of shift register cell 220-N is applied to adder 232 of the recursive filter through gain control logic 230. Cell 220-N stores the last or Nth symbol of the sequence used in transversal filter 220. Signal $x(n)$ obtained from cell 220-N is a two bit code corresponding to the symbol in the stored sequence occurring at $t_1$. The output of cell 220-N is applied to adder 232 of the recursive filter via multiplier 230 which modifies signal $x(n)$ by a factor $g_e(n)$. Adaptation signal $g_e(n)$ is an adaptive coefficient which is updated in accordance with the cancellation error signal $r_e(n)$ of summing circuit 245.

Prior art recursive tail canceling arrangements have utilized vector quantization and other complex approximations to form tail replicas. The accuracy of these recursive arrangements, however, is not sufficient to provide complete tail cancellation. We have found that the tail portion of the near end echo in partially canceled signal $q_e(n)$ is primarily a function of the parameters of the transformer used to couple the transceiver of terminal 100-1 to line 130. The transformer parameters result in an echo having an exponentially decreasing tail portion. Consequently, a highly accurate tail replica may be formed using the infinite impulse response of a single pole recursive filter. In accordance with the invention, the recursive filter of FIG. 3 operates via delay 240 and multiplier 235 to alter the signal from gain control logic 230 with its exponentially decreasing infinite impulse function having a preset pole $\beta$. Multiplier 235 alters the output of delay 240 by a factor $\beta$ which controls the time constant of the filter impulse response so that the filter output $$p_e(n) = \beta[p_e(n-1) + g_e(n) \times (n)] \quad (3)$$

is a replica of the echo tail. Signal $p_e(n-1)$ is applied to summing circuit 245 to cancel the tail portion of the near end echo in signal $q_e(n)$ from summing circuit 224. $\beta$ is a stored constant value signal selected to correspond to the characteristics of the particular transformer 125-1 in the subscriber terminal transceiver of FIG. 1. Typically, $\beta$ has a value of 0.989 but may be changed to optimize the echo cancellation of the transceiver. In particular, the value of $\beta$ must be modified in the event the characteristics of the terminal transformer change.

Gain control coefficient $g_e(n)$ applied to multiplier 230 is adjusted in each succeeding symbol period n in response to signal $r_e(n)$ from the output of summer 245, the stored value of the tail echo replica signal $p_e(n-1)$ and the present value of the coefficient signal $g_e(n)$. The cancellation error signal $r_e(n)$ is scaled by a constant $\alpha$ in scaling circuit 305 to limit the extent of adaptation. $\alpha$ may be selected to be a convenient negative power of 2 such as $2^{-26}$ whereby scaler circuit 305 may comprise a simple shift register. The output of scaler 305 has a fixed number of bit positions so that errors due to truncation in the scaler would be in the same direction in successive symbol periods. As will be described, the successive values generated by scaler 305 are accumulated. To avoid accumulation of truncation errors, the scaler output is rounded in rounding circuit 310. Rounding assures that the average of accumulated errors in the fixed length signal $\alpha r_e(n)$ tends to zero.

The rounded scaled cancellation error $\alpha r_e(n)$ is used to update adaptive gain control signal $g_e(n)$. If signal $g_e(n)$ and echo replica signal $p_e(n-1)$ are of the same sign, the next value of the gain control signal is made larger to increase the next value of signal $g_e(n)$ by $\alpha r_e(n)$. Where signals $p_e(n-1)$ and $g_e(n)$ have opposite signs, the next value of gain control signal $g_e(n)$ is decreased by $\alpha r_e(n)$. This is accomplished through sign changer circuit 315 and an integrator arrangement connected thereto. The operation of sign changer 315 is controlled by sign extracting circuits 320 and 330 and exclusive or gate 332. The stored value of the echo replica signal $p_e(n-1)$ is supplied to sign extracting circuit 320 while the signal $g_e(n)$ is supplied to sign extracting circuit 330. Each sign extracting circuit determines whether its input is positive or negative. The output of the sign extracting circuit is a one for a positive input value and a minus one for a negative input value. In the event that the sign outputs of sign extracting circuits 320 and 330 are different, exclusive or gate 332 applies a control signal to sign changer circuit 315 so that its output $u_e(n)$ is $-\alpha r_e(n)$. If the outputs of sign extracting circuits 320 and 330 are the same, exclusive or gate 332 applies a zero to sign changer circuit 315 and its output $u_e(n)$ is $\alpha r_e(n)$. In general $$u(n) = \text{round}[\alpha r_e(n)] \cdot sgn[g_e(n)] \cdot sgn(p_e(n-1)] \quad (4)$$

Signal $u_e(n)$ from sign changer circuit 315 is applied to the digital integrator circuit comprising adder 340 and delay 345 through delay 335. In FIG. 3, delay 335 is set to one symbol period T to compensate for summing and multiplication processing time to form the signal at the output of sign changer circuit 315. This delay is adjusted to accommodate the timing of the processing circuits and more delay or no delay may be used in accordance with the speed of the processing circuits. The integrator circuit accumulates the successive values of signal from sign changer 315 to form the gain control signal $g(n)$ according to the relationship $$g_e(n+1) = g_e(n) + u_e(n) \quad (5)$$

In accordance with the invention, the gain control signal $g_e(n)$ from delay 345 is then applied to multiplier 230 to modify the $x(n)$ signal from shift register stage 220-N shown in FIG. 2. Multiplier 230 at the input of the recursive filter operates to multiply the Nth stored symbol value by the gain control signal $g_e(n)$. The recursive filter is thereby put inside the adaptation loop so that the multiplication of the automatic gain signal $g_e(n)$ is simplified. As aforementioned, the Nth stored symbol has one of four values which are represented by two bit positions. Consequently, the structure of multiplier 230 is also simplified.

Figure 4:
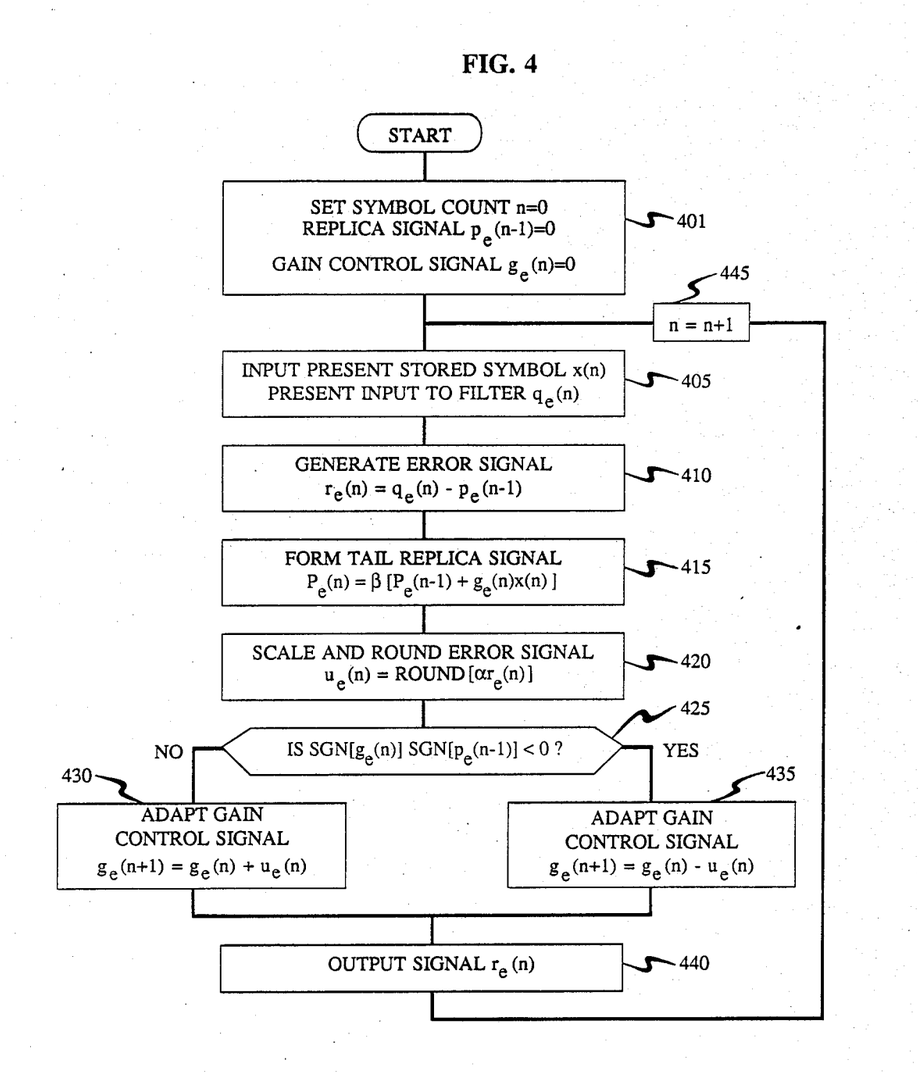
FIG. 4 is a flow chart illustrating the operation of the tail canceler of FIGS. 2 and 3.

The tail canceler described with respect to FIG. 3 may be implemented with the circuit elements shown therein or alternatively implemented in a digital signal processor such as the Western Electric type WE DSP 32 having a stored program therein adapted to perform the sequence of operations illustrated in the flow chart of FIG. 4. Referring to FIG. 4, the processor is initialized for tail cancellation by resetting the symbol period count n, the stored value of the near end tail replica $p_e(n-1)$ and the present value of the gain control signal $g_e(n)$ to zero in step 401. In each symbol period n, the loop from step 405 to step 445 is iterated. In step 405, the current value of the received signal with partial echo cancellation is obtained from summer 224 and signal $x(n)$ is received from stage 220-N of shift register 220 of FIG. 2. The tail cancellation error $r_e(n)$ is generated in step 410 and the near end echo replica $p_e(n)$ is produced in accordance with equation 3 in step 415.

Cancellation error signal $r_e(n)$ is scaled by a factor $\alpha$ to form rounded signal $u_e(n)$ in step 420. Decision step 425 is then entered in which the product of the signs of the signals $p_e(n-1)$ and $g_e(n)$ is compared to zero. If the product of the signs is less than zero, signal $g_e(n)$ is modified by subtracting the value of $u_e(n)$ therefrom (step 435). Otherwise, signal $g_e(n)$ is modified by adding the value of $u_e(n)$ in step 430. In either event, the current value of signal $r_e(n)$ corresponding to the signal $q_e(n)$ with the near end tail canceled is outputted (step 440). Symbol count signal n is then incremented in step 445 and the operations of the loop are repeated for the next symbol period.

Figure 7:
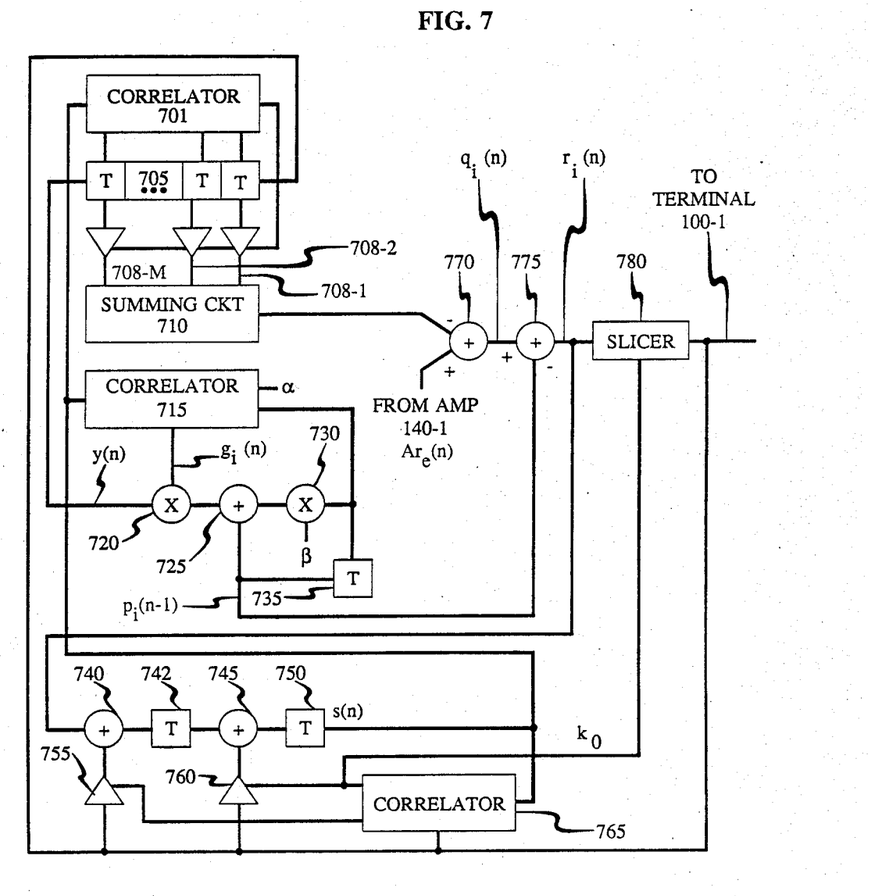
FIG. 7 depicts a detailed block diagram of the decision feedback equalizer of FIG. 1 with a tail equalizer illustrative of the invention.

Decision feedback equalizer 150-1 shown in FIG. 1 is illustrated in greater detail in FIG. 7. The equalizer of FIG. 7 includes a non-recursive filter comprising correlator 701, delay device 705, programmable gain amplifiers 708-1 through 708-M and summing circuit 710, a recursive filter comprising correlator 715, multipliers 720 and 730, adder 725 and delay device 735 and a precursor and main cursor non-recursive filter comprising correlator 765, adders 740 and 745, delay devices 742 and 750, and programmable gain amplifiers 755 and 760. The output of gain controlled amplifier 140-1, $Ar_e(n)$, is applied to adder 770. This adder is responsive to the transversal filter output from summer 710 to remove the intersymbol interference corresponding to the M digital symbols stored in delay device 705. The subsequent intersymbol interference is removed in adder 775 responsive to signal $p_i(n-1)$ from the recursive filter and the resultant signal is converted into prescribed symbols in slicer 780.

The output of adder 775 is also applied to adder 740 in the precursor and main cursor filter arrangement. This filter operates to remove the precursor and main cursor components of the signal so that the signal s(n) at the output of delay 750 corresponds to the adaptation error of the equalizer. The main cursor coefficient $k_0$ is applied to slicer 780 to control threshold value therein for detecting symbol levels. The adaptation error signal s(n) is applied to correlator 765 of the precursor and main cursor filter, to correlator 715 of the equalizer recursive filter and to correlator 701 of the equalizer non-recursive filter. Correlator 765 provides a main cursor filter coefficient signal to control logic 760 and a precursor filter coefficient signal to control logic 755. A timing recovery circuit (not shown) of a type well known in the art controls the sampling phase so that the precursor intersymbol interference is reduced to zero.

Delay device 705 of the transversal filter has M stages and stores the sequence of M most recent symbol values obtained from the output of slicer 780. As aforementioned with respect to the transversal filter of FIG. 2, each symbol is stored as a two bit code. The stored symbol codes are applied to correlator 701 and to programmable gain amplifiers 708-1 through 708-M as shown. Correlator 701 provides a set of M filter coefficient signals to determine the gains of programmable gain amplifiers 708-1 through 708-M. The outputs of the programmable gain amplifiers are summed in summing circuit 710. Summing circuit 710 is operative to form a replica of the current value of the intersymbol interference corresponding to the sequence of stored M symbols. This intersymbol replica is subtracted from the equalizer input signal in adder 770 to produce signal $q_i(n)$.

The symbol stored in stage 705-M of delay device 705 is outputted to multiplier 720 of the recursive filter section of the equalizer as input y(n). The recursive filter is substantially identical to the recursive echo canceler illustrated in FIG. 3 and operates to modify input y(n) by a gain control factor $g_i(n)$ in multiplier 720. Signal $g_i(n)$ is adapted responsive to the interference replica signal $p_i(n-1)$ and the error signal s(n) from the output of delay device 750 via correlator 715. The modified output of multiplier 720, $g_i(n)y(n)$, is combined with the recursive filter signal from delay 735 in adder 725 to form the tail intersymbol interference replica $$p_i(n) = \beta[p_i(n-1) + g_i(n)y(n)] \quad (6)$$

where a constant value $\beta$ signal applied to multiplier 730 determines the location of the pole of the recursive filter impulse response. As described with respect to the recursive filter of the echo canceler, the impulse response of the recursive filter is an exponentially decreasing function representative of the characteristics of the transmission path during the tail portion of the far end signal. The resulting replica signal $p_i(n)$ then accurately represents the intersymbol interference subsequent to the Mth digital symbol of the sequence stored in delay device 705. The far term replica signal $p_i(n-1)$ from delay 735 is applied to one input of adder 775 wherein it is subtracted from signal $q_i(n)$ representative of the received signal $Ar_e(n)$ with the intersymbol interference corresponding to the stored sequence of M symbols removed therefrom.

The gain control factor signal $g_i(n)$ is generated as shown in FIG. 3 in accordance with equations 7 and 8.

$$u_i(n) = \text{round}[\alpha s(n)] * \text{sgn}[g_i(n)] * [\text{sgn}(p_i(n)] \quad (8)$$

where $u_i(n)$ is the rounded value of the scaled error signal.

The error signal s(n) from delay device 750 replaces signal $r_e(n)$ in the tail canceler of FIG. 3 and the output of delay stage 705-M is the signal y(n) applied to multiplier 720 rather than signal x(n) in the tail canceler of FIG. 3.

Figure 8:
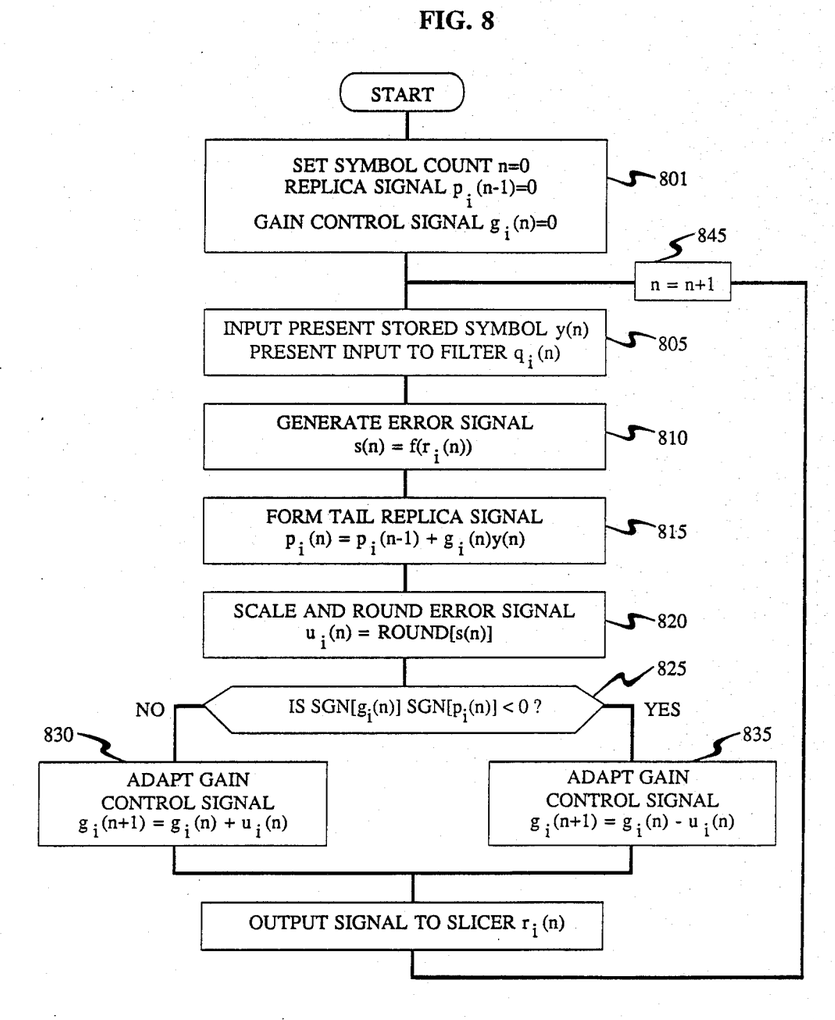
FIG. 8 is a flow chart illustrating the operation of the tail equalizer of FIG. 7.

As aforementioned with respect to the tail canceler, the tail equalizer recursive filter of FIG. 7 may be implemented with the circuit elements shown therein or alternatively implemented in the Western Electric type WE DSP 32 signal processor operated in accordance with a stored program adapted to perform the sequence of operations illustrated in the flow chart of FIG. 8, Referring to FIG. 8, the processor is initialized for intersymbol interference cancellation by resetting the symbol period count signal n, the store value of the intersymbol interference tail replica $p_i(n-1)$ and the gain control signal $g_i(n)$ to zero in step 801. In each symbol period n, the loop from step 805 to step 845 is iterated. In step 805, the current value of the signal $q_i(n)$ is received from adder 770 and signal y(n) is received from stage 705-M of shift register 705 of FIG. 7. The error signal s(n) is generated in step 810 and the far end intersymbol interference replica $p_i(n)$ is produced in according to equation 6 in step 815.

Signal s(n) is scaled by a factor $\alpha$ (step 820) to form signal $u_i(n)$ which signal is rounded in step 820. Decision step 825 is then entered in which the product of the signs of the signals $p_i(n)$ and $g_i(n)$ is compared to zero. If the product of the the signs is less than zero, signal $g_i(n)$ is modified by subtracting the value of $u_i(n)$ therefrom (step 835). Otherwise, signal $g_i(n)$ is modified by adding the value of $u_i(n)$ in step 830. In either event, the current value of signal $r_i(n)$ corresponding to the signal $q_i(n)$ with the far end tail intersymbol interference canceled is outputted (step 840). Symbol count signal r is then incremented in step 845 and the operations of the loop are repeated for the next symbol period.

The invention has been described with reference to illustrative embodiments thereof. It is apparent, however, to one skilled in the art that various modifications and changes may be made without departing from the spirit and scope of the invention.

We claim:

1. In a communication system for exchanging digital symbols between terminals over a bidirectional transmission path, the method for removing a prescribed interference component in a signal received at a terminal comprising the steps of:

storing a sequence of successive digital symbols 1, 2, ..., N applied to the bidirectional transmission path in successive symbol time periods, generating a replica signal representative of the prescribed interference component in the received signal subsequent to the symbol time periods of the stored sequence of successive digital symbols; and combining the replica signal with the received signal to cancel the prescribed interference component in the received signal subsequent to the time periods of the sequence of successive digital symbols;

the step of generating the prescribed interference component replica signal including selecting the Nth stored symbol in the sequence in each symbol period of the received signal, forming an adaptive gain signal corresponding to the correlation of the replica signal and the signal representative of the received signal with the prescribed interference component removed in each symbol time period, modifying the Nth stored symbol by the adaptive gain signal, and recursively altering the modified Nth symbol with an expontentially decreasing infinite impulse response corresponding to the characteristics of the bidirectional transmission path subsequent to the time period of the Nth digital symbol of the sequence of successive digital symbols.

2. In a communication system for exchanging digital symbols between terminals over a bidirectional transmission path, the method for removing a prescribed interference component in a signal received at a terminal according to claim 1 wherein the prescribed interference component is a near end echo component and the sequence of stored digital symbols comprises the N digital symbols applied to the bidirectional transmission path from the terminal.

3. In a communication system for exchanging digital symbols between terminals over a bidirectional transmission path, the method for removing the far end intersymbol interference component in a signal received at a terminal comprising the steps of:

storing a sequence of successive digital symbols 1, 2, ..., N applied to the bidirectional transmission path in successive symbol time periods, the digital symbols representing the N digital symbols applied to the bidirectional transmission path from the terminal at the other end of the bidirectional transmission path, generating a replica signal representative of the far end intersymbol interference component in the received signal subsequent to the symbol time periods of the stored sequence of successive digital symbols; and combining the replica signal with the received signal to cancel the far end intersymbol interference component in the received signal subsequent to the time periods of the sequence of successive digital symbols;

the step of generating the far end intersymbol interference component replica signal including selecting the Nth stored symbol in the sequence in each symbol period of the received signal, forming an adaptive gain signal corresponding to the correlation of the replica signal and the signal representative of the received signal with the far end intersymbol interference component removed in each symbol time period, modifying the Nth stored symbol by the adaptive gain signal, and recursively altering the modified Nth stored symbol with an exponentially decreasing impulse response corresponding to the characteristics of the bidirectional transmission path subsequent to the time periods of the sequence of N successive digital symbols.

4. In a communication system for exchanging digital symbols between terminals over a bidirectional transmission path, the method for cancelling echoes in the signal received from the bidirectional transmission path comprising the steps of:

storing a sequence of N successive digital symbols 1, 2, ..., N applied to the bidirectional transmission path from the terminal in successive symbol periods n, forming a replica of the echo corresponding to the sequence of N successive digital symbols from the terminal responsive to the stored sequence, combining the echo replica corresponding to the sequence of N successive digital symbols with the current value of the signal received from the bidirectional transmission path to form a signal representative of the current value of the received signal with the echo replica corresponding to the stored sequence of N successive digital symbols removed therefrom, generating signal representative of a replica of the echo in the received signal subsequent to the stored sequence of N successive digital symbols; and combining the signal representative of the replica of the echo in the received signal subsequent to the stored sequence of N successive symbols with the signal representative of difference between the received signal and the echo replica corresponding to the stored sequence of N successive digital symbols to cancel the echo in the received signal subsequent to the symbol time periods of the stored sequence of N successive digital symbols;

the step of generating the signal representative of the replica of the echo in the received signal subsequent to the stored sequence of N successive digital symbols comprising forming an adaptive gain signal corresponding to the correlation of the signal representative of the replica of the echo in the received signal subsequent to the symbol time periods of the sequence of stored N successive symbols and the received signal having the echo canceled therefrom, modifying the Nth stored successive symbol with the adaptive gain signal, and recursively altering the modified Nth stored successive sample with an exponentially decreasing infinite impulse response corresponding to the characteristics of the bidirectional transmission path subsequent to the sequence of N successive digital symbols.

5. In a communication system for exchanging digital symbols between terminals over a bidirectional transmission path, a method for cancelling the intersymbol interference component in the signal received from the bidirectional transmission path comprising the steps of:

storing a sequence of successive digital symbols 1, 2, ..., M received from the bidirectional transmission path in successive symbol periods n, forming a replica of the intersymbol interference component corresponding to the sequence of M successive digital symbols responsive to the stored sequence, combining the intersymbol interference component replica corresponding to the sequence of M successive digital symbols with the current value of the signal received from the bidirectional transmission path to form a signal representative of the current value of the received signal with the intersymbol interference component replica corresponding to the stored sequence of M successive digital symbols removed therefrom, generating a signal representative of a replica of the intersymbol interference component in the received signal subsequent to the stored sequence of M successive digital symbols; and combining the signal representative of the replica of the intersymbol interference component in the received signal subsequent to the stored sequence of M successive symbols with the signal representative of difference between the received signal and the intersymbol interference component replica corresponding to the stored sequence of M successive digital symbols to cancel the intersymbol interference component in the received signal subsequent to the time periods of the sequence of M successive digital symbols;

the step of generating the signal representative of the replica of the intersymbol interference component in the received signal subsequent to the stored sequence of M successive digital symbols comprising forming an adaptive gain signal corresponding to the correlation of the signal representative of the replica of the intersymbol interference component in the received signal subsequent to the stored sequence of M successive symbols with the received signal having the intersymbol interference removed therefrom, modifying the Mth stored successive symbol by the adaptive gain signal, and recursively altering the modified Mth stored successive digital symbol with a prescribed impulse response corresponding to the characteristics of the bidirectional transmission path subsequent to the time periods of the M successive digital symbols to form the signal.

6. In a communication system for exchanging digital symbols between terminals over a bidirectional transmission path, the method for cancelling intersymbol interference component in the signal received from the bidirectional transmission path according to claim 5 wherein the prescribed impulse response for recursively altering the modified Mth stored successive symbol is an exponentially decreasing response corresponding to the characteristics of the bidirectional transmission path subsequent to the time periods of the sequence of M successive digital symbols.

7. In a communication system for exchanging digital symbols between terminals over a bidirectional transmission path, the method for cancelling intersymbol interference component in the signal received from the bidirectional transmission path according to claim 6 wherein the recursive altering of the modified Mth stored successive symbol is performed in accordance with the relationship $$p_i(n) = \beta[p_i(n-1) + g_i(n)y(n)]$$

where $p_i(n)$ is the value of the signal representative of the intersymbol interference component replica in the received signal subsequent to the stored sequence of M successive digital symbols in the symbol period n, $\beta$ is a constant determinative of the pole of the impulse response, $p_i(n-1)$ is value of the signal representative of the intersymbol interference component replica subsequent to the time periods of the stored sequence of M symbols in the symbol period n−1, $g_i(n)$ is the value of the adaptive gain signal in the symbol period n, and $y(n)$ is the value of the stored Mth symbol in the symbol period n.

8. In a communication system for exchanging digital symbols between terminals over a bidirectional transmission path, the method for cancelling intersymbol interference component in the signal received from the bidirectional transmission path according to claim 7 wherein the adaptive gain signal $g_i(n)$ is updated on the occurrence of each successive symbol in accordance with the relationship $$g_i(n+1) = g_i(n) + \alpha r_i(n) sgn[p_i(n)] sgn[g_i(n)]$$

where n is the time period of the current symbol, n−1 is the time period of the immediately preceding symbol, $\alpha$ is a constant, $$r_i(n) = q_i(n) - p_i(n-1),$$

$q_i(n)$ is the signal representative of the difference between the received signal and the intersymbol interference component replica corresponding to the stored sequence of M symbols in the symbol period n, $sgn[p_i(n)]$ is the sign of the signal representative of the intersymbol interference component replica in the symbol period n, and $sgn[g_i(n)]$ is the sign of the adaptive gain signal in the symbol period n.

9. In a communication system for exchanging digital symbols between terminals over a bidirectional transmission path, the circuit for removing a prescribed interference component in a signal received at a terminal comprising means for storing a sequence of successive digital symbols 1, 2, ..., N applied to the bidirectional transmission path in successive symbol periods n, means responsive to the stored sequence of N successive digital symbols for generating a replica signal representative of the prescribed interference component in the received signal subsequent to the stored sequence of successive digital symbols; and means for combining the replica signal p(n) with the received signal to cancel the prescribed interference component in the received signal subsequent to the time periods of the sequence of N successive digital symbols;

the means for generating the replica signal includes means for selecting the Nth stored symbol in the sequence in each symbol period of the received signal, means responsive to the replica signal and the signal representative of the received signal with the prescribed interference component removed for forming an adaptive gain signal corresponding to the correlation of the replica signal and the signal representative of the received signal with the prescribed interference component removed, means for modifying the Nth stored symbol by the adaptive gain signal, and means for recursively altering the modified Nth symbol with an exponentially decreasing infinite impulse response corresponding to the characteristics of the bidirectional transmission path subsequent to the sequence of N successive digital symbols.

10. In a communication system for exchanging digital symbols between terminals over a bidirectional transmission path, the circuit for removing a prescribed interference component in a signal received at a terminal according to claim 9 wherein the prescribed interference component is a near end echo component and the sequence of stored N digital symbols comprises the N digital symbols applied to the bidirectional transmission path from the terminal.

11. In a communication system for exchanging digital symbols between terminals over a bidirectional transmission path, a circuit for removing the far end intersymbol interference component in a signal received at a terminal comprising means for storing a sequence of successive digital symbols 1, 2, ..., N representative of the N digital symbols applied to the bidirectional transmission path from the terminal at the other end of the bidirectional transmission path in successive symbol periods n, means responsive to the stored sequence of N successive digital symbols for generating a replica signal representative of the far end intersymbol interference component in the received signal subsequent to the stored sequence of successive digital symbols; and means for combining the replica signal with the received signal to cancel the far end intersymbol interference component in the received signal subsequent to the time periods of the sequence of N successive digital symbols;

the means for generating the replica signal includes means for selecting the Nth stored symbol in the sequence in each symbol period of the received signal, means responsive to the replica signal and the signal representative of the received signal with the far end intersymbol interference component removed for forming an adaptive gain signal corresponding to the correlation of the replica signal and the signal representative of the received signal with the far end intersymbol interference component removed, means for modifying the Nth stored symbol by the adaptive gain signal, and means for recursively altering the modified Nth symbol with a prescribed impulse response corresponding to the characteristics of the bidirectional transmission path subsequent to the time periods of the sequence of N successive digital symbols to form the replica signal.

12. In a communication system for exchanging digital symbols between terminals over a bidirectional transmission path, the circuit for cancelling echoes in the signal received from the bidirectional transmission path comprising:

means for storing a sequence of N successive digital symbols from the terminal in successive symbol periods n, means responsive to the stored sequence of N successive digital symbols for forming a replica of the echo corresponding to the sequence of N successive digital symbols from the terminal responsive to the stored sequence, means for combining the echo replica corresponding to the sequence of N successive digital symbols with the current value of the signal received from the bidirectional transmission path to form a signal representative of the current value of the received signal with the echo replica corresponding to the stored sequence of N successive digital symbols removed therefrom, means for generating signal representative of a replica of the echo in the received signal subsequent to the stored sequence of N successive digital symbols; and means for combining the signal representative of the replica of the echo in the received signal subsequent to the stored sequence of N successive symbols with the signal representative of difference between the received signal and the echo replica corresponding to the stored sequence of N successive digital symbols to cancel the echo in the received signal subsequent to the symbol periods of the stored sequence of N successive digital symbols;

the means for generating the signal representative of the replica of the echo in the received signal subsequent to the stored sequence of N successive digital symbols comprising means for forming an adaptive gain signal corresponding to the correlation of the signal representative of the replica of the echo in the received signal subsequent to the stored sequence of N successive samples and the received signal having the echo canceled therefrom, means responsive to the adaptive gain signal for modifying the Nth stored successive symbol, and means for recursively altering the modified Nth stored successive sample with an exponentially decreasing infinite impulse response corresponding to the characteristics of the bidirectional transmission path subsequent to the sequence of N successive digital symbols.

13. In a communication system for exchanging digital symbols between terminals over a bidirectional transmission path, a circuit for cancelling the intersymbol interference component in the signal received from the bidirectional transmission path comprising:

means for storing a sequence of successive digital symbols 1, 2, ..., M received from the bidirectional transmission path in successive symbol periods n, means responsive to the received sequence of M successive digital symbols for forming a replica of the intersymbol interference component corresponding to the sequence of M successive digital symbols, means for combining the intersymbol interference component replica corresponding to the sequence of M successive digital symbols with the current value of the signal received from the bidirectional transmission path to form a signal representative of the current value of the received signal with the intersymbol interference component replica corresponding to the stored sequence of M successive digital symbols removed therefrom, means for generating a signal representative of a replica of the intersymbol interference component in the received signal subsequent to the symbol periods of the stored sequence of M successive digital symbols; and means for combining the signal representative of the replica of the intersymbol interference component in the received signal subsequent to the symbol periods of the stored sequence of M successive symbols with the signal representative of difference between the received signal and the intersymbol interference component replica corresponding to the stored sequence of M successive digital symbols to cancel the intersymbol interference component in the received signal subsequent to the symbol periods of the stored sequence of M successive digital symbols;

the means for generating the signal representative of the replica of the intersymbol interference component in the received signal subsequent to the symbol periods of the stored sequence of M successive digital symbols comprising means responsive to the replica signal for forming an adaptive gain signal corresponding to the correlation of the signal representative of the replica of the intersymbol interference component in the received signal subsequent to the symbol periods of the stored sequence of M successive digital symbols and the received signal having the intersymbol interference removed therefrom, means for modifying the Mth stored successive symbol with the adaptive gain signal, and means for recursively altering the modified Mth stored successive digital symbol with a prescribed impulse response corresponding to the characteristics of the bidirectional transmission path subsequent to the symbol periods of the sequence of M successive digital symbols to form the signal.

14. In a communication system for exchanging digital symbols between terminals over a bidirectional transmission path, the circuit for cancelling the intersymbol interference component in the signal received from the bidirectional transmission path according to claim 13 wherein the prescribed impulse response for recursively altering the modified Mth stored successive symbol is an exponentially decreasing response corresponding to the characteristics of the bidirectional transmission path subsequent to the symbol periods of the sequence of M successive digital symbols.

15. In a communication system for exchanging digital symbols between terminals over a bidirectional transmission path, the method for removing a prescribed interference component in a signal received at a terminal comprising the steps of:

storing a sequence of successive digital symbols 1, 2, ..., N applied to the bidirectional transmission path in successive symbol time periods, generating a replica signal representative of the prescribed interference component in the received signal subsequent to the symbol time periods of the stored sequence of successive digital symbols; and combining the replica signal with the received signal to cancel the prescribed interference component in the received signal subsequent to the time periods of the sequence of successive digital symbols;

the step of generating the prescribed interference component replica signal including selecting the Nth stored symbol in the sequence in each symbol period of the received signal, forming an adaptive gain signal corresponding to the correlation of the replica signal and the signal representative of the received signal with the prescribed interference component removed in each symbol time period, modifying the Nth stored symbol by the adaptive gain signal, and recursively altering the modified Nth stored symbol with an exponentially decreasing impulse response characterized by a single pole and performed in accordance with the relationship $$p(n) = \beta[p(n-1) + g(n) \times (n)]$$

where $p(n)$ is the value of the replica signal representative of the prescribed interference component in the received signal subsequent to the symbol time periods of the stored sequence of successive digital symbols in the symbol period n, $\beta$ is a constant determinative of the single pole of the impulse response $p(n-1)$ is the value of the signal representative of the prescribed interference component subsequent to the stored sequence of digital symbols in the symbol period $n-1$, $g(n)$ is the value of the adaptive gain signal in the symbol period n, and $x(n)$ is the value of the stored Nth symbol in the symbol period n.

16. In a communication system for exchanging digital symbols between terminals over a bidirectional transmission path, the method for removing a prescribed interference component in a signal received at a terminal according to claim 15 wherein the adaptive gain signal $g(n)$ is updated on the occurrence of each successive symbol in accordance with the relationship $$g(n+1) = g(n) + \alpha r(n) sgn[p(n-k_1)] sgn[g(n-k_2)]$$

where n is the time period of the current symbol, $n-1$ is the time period of the immediately preceding symbol, $\alpha$ is a constant, $k_1$ and $k_2$ are non-negative integers $$r(n) = q(n) - p(n-1),$$

q(n) is the signal representative of the difference between the received signal and the prescribed interference component corresponding to the sequence of stored digital symbols in the symbol period n, $\text{sgn}[p(n-k_1)]$ is the sign of the signal representative of the echo replica in the symbol period $n-k_1$, and $\text{sgn}[g(n-k_2)]$ is the sign of the adaptive gain signal in the symbol period $n-k_2$.

17. In a communication system for exchanging digital symbols between terminals over a bidirectional transmission path, the method for cancelling echoes in the signal received from the bidirectional transmission path comprising the steps of:

storing a sequence of successive digital symbols 1, 2, ..., N applied to the bidirectional transmission path from the terminal in successive symbol periods n, forming a replica of the echo corresponding to the sequence of N successive digital symbols from the terminal responsive to the stored sequence, combining the echo replica corresponding to the sequence of N successive digital symbols with the current value of the signal received from the bidirectional transmission path to form a signal representative of the current value of the received signal with the echo replica corresponding to the stored sequence of N successive digital symbols removed therefrom, generating a signal representative of a replica of the echo in the received signal subsequent to the stored sequence of N successive digital symbols; and combining the signal representative of the replica of the echo in the received signal subsequent to the stored sequence of N successive symbols with the signal representative of the difference between the received signal and the echo replica corresponding to the stored sequence of N succesive digital symbols to cancel the echo in the received signal subsequent to the symbol time periods of the stored sequence of N successive digital symbols;

the step of generating the signal representative of the replica of the echo in the received signal subsequent to the stored sequence of N successive digital symbols comprising forming an adaptive gain signal corresponding to the correlation of the signal representative of the replica of the echo in the received signal subsequent to the symbol time periods of the sequence of stored N successive symbols and the received signal having the echo canceled therefrom, modifying the Nth stored successive symbol with the adaptive gain signal, and recursively altering the modified Nth stored successive digital symbol with an exponentially decreasing impulse response corresponding to the characteristics of the bidirectional transmission path subsequent to the sequence of N successive digital symbols to form the signal representative of the replica of the echo in the received signal in accordance with the relationship $$p_e(n) = \beta[p_e(n-1) + g_e(n) \times (n)]$$

where $p_e(n)$ is the value of the signal representative of a replica of the echo in the received signal subsequent to the stored sequence of N symbols in the symbol period n, $\beta$ is a constant determinative of the pole of the impulse response, $p_e(n-1)$ is the value of the signal representative of the echo replica subsequent to the stored sequence of N symbols in the symbol period $n-1$, $g_e(n)$ is the value of the adaptive gain signal in the symbol period n, and x(n) is the value of the stored Nth symbol in the symbol period n.

18. In a communication system for exchanging digital symbols between terminals over a bidirectional transmission path, the method for cancelling echoes in the signal received from the bidirectional transmission path according to claim 17 wherein the adaptive gain signal g(n) is updated on the occurrence of each successive symbol in accordance with the relationship $$g_e(n+1) = g_e(n) + \alpha r_e(n) \text{sgn}[p_e(n-1)] \text{sgn}[g_e(n)]$$

where n is the time period of the current symbol, $n-1$ is the time period of the immediately preceding symbol, $\alpha$ is a constant, $$r_e(n) = q_e(n) - p_e(n-1),$$

$q_e(n)$ is the signal representative of the difference between the received signal and the echo replica corresponding to the stored sequence of N symbols in the symbol period n, $\text{sgn}[p_e(n-1)]$ is the sign of the signal representative of the echo replica in the symbol period $n-1$, and $\text{sgn}[g_e(n)]$ is the sign of the adaptive gain signal in the symbol period n.

19. In a communication system for exchanging digital symbols between terminals over a bidirectional transmission path, a circuit for removing a prescribed interference component in a signal received at a terminal comprising means for storing a sequence of successive digital symbols 1, 2, ..., N applied to the bidirectional transmission path in successive symbol periods n, means responsive to the stored sequence of N successive digital symbols for generating a replica signal representative of the prescribed interference component in the received signal subsequent to the stored sequence of successive digital symbols; and means for combining the replica signal with the received signal to cancel the prescribed interference component in the received signal subsequent to the time periods of the sequence of N successive digital symbols;

the means for generating the replica signal includes means for selecting the Nth stored symbol in the sequence in each symbol period of the received signal, means responsive to the replica signal and the signal representative of the received signal with the prescribed interference component removed for forming an adaptive gain signal corresponding to the correlation of the replica signal and the signal representative of the received signal with the prescribed interference component removed, means for modifying the Nth stored symbol by the adaptive gain signal, and means for recursively altering the modified Nth stored successive symbol with an impulse response characterized by a single pole comprising means for forming a signal in accordance with the relationship $$p(n) = \beta[p(n-1) + g(n) \times (n)]$$

where
- p(n) is a value of the replica signal representative of the prescribed interference component in the received signal subsequent to the stored sequence of N successive digital symbols in the symbol period n,
- $\beta$ is a constant determinative of the single pole of the impulse response
- p(n−1) is the value of the signal representative of the prescribed interference replica subsequent to the sequence of N symbols in the symbol period n−1,
- g(n) is the value of the adaptive gain signal in the symbol period n, and
- x(n) is the value of the stored selected symbol in the symbol period n.

20. In a communication system for exchanging digital symbols between terminals over a bidirectional transmission path, the circuit for removing a prescribed interference component in a signal received at a terminal according to claim 19 wherein
the adaptive gain signal g(n) forming means comprises means for updating the adaptive gain signal on the occurrence of each successive symbol in accordance with the relationship $$g(n+1) = g(n) + \alpha r(n) sgn[p(n-k_1)] sgn[g(n-k_2)]$$

where n is the time period of the current symbol,
n−1 is the time period of the immediately preceding symbol,
$\alpha$ is a constant,
$k_1$ and $k_2$ are non-negative integers, $$r(n) = q(n) - p(n-1),$$

sgn[p(n−$k_1$)] is the sign of the signal representative of the prescribed interference replica in the symbol period n−$k_1$,
sgn[g(n−$k_2$)] is the sign of the signal representative of the adaptive gain in symbol period n−$k_2$, and
q(n) is the signal representative of the difference between the received signal and the prescribed interference replica corresponding to the stored sequence of N symbols in the symbol period n.

* * * * *

UNITED STATES PATENT AND TRADEMARK OFFICE
CERTIFICATE OF CORRECTION

PATENT NO. : 4,982,428
DATED : January 1, 1991
INVENTOR(S) : Oscar E. Agazzi and Taiho Koh It is certified that error appears in the above-identified patent and that said Letters Patent is hereby corrected as shown below: On Title Page;

At Attorney, Agent, or Firm-, "L. H. Birnbaum" should read --J. S. Cubert and L. H. Birnbaum--. Column 1, line 43, "Mar. 19, 1974 issued to" should read --issued Mar. 19, 1974 to--.

Column 8, line 8, $$"u(n) = \text{round}[\alpha r_e(n)]*\text{sgn}[g_e(n)]*\text{sgn}(p_e(n-1)]$$

should read $$--u(n) = \text{round}[\alpha r_e(n)]*\text{sgn}[g_e(n)]*\text{sgn}[p_e(n-1)]$$

Column 10, line 21

$$"u_i(n) = \text{round}[\alpha s(n)]*\text{sgn}[g_i(n)]*[\text{sgn}(p_i(n)]$$

should read $$--u_i(n) = \text{round}[\alpha s(n)]*\text{sgn}[g_i(n)]*\text{sgn}[p_i(n)]$$

$$g_i(n+1) = g_i(n) + u_i(n)$$

Column 10, line 60, "signal r" should read --signal n--.

Signed and Sealed this

Fifteenth Day of September, 1992

Attest:

DOUGLAS B. COMER

*Attesting Officer*     *Acting Commissioner of Patents and Trademarks*